United States Patent
Zhang et al.

(10) Patent No.: US 12,217,406 B2
(45) Date of Patent: Feb. 4, 2025

(54) VIDEO IMAGE INTERFERENCE DETECTION METHOD, SYSTEM, DEVICE AND MEDIUM

(71) Applicant: Suzhou MetaBrain Intelligent Technology Co., Ltd., Suzhou (CN)

(72) Inventors: Yongxing Zhang, Suzhou (CN); Ruizhen Wu, Suzhou (CN); Jingjing Chen, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 18/567,615

(22) PCT Filed: May 26, 2022

(86) PCT No.: PCT/CN2022/095383
§ 371 (c)(1),
(2) Date: Dec. 6, 2023

(87) PCT Pub. No.: WO2023/109016
PCT Pub. Date: Jun. 22, 2023

(65) Prior Publication Data
US 2024/0265516 A1 Aug. 8, 2024

(30) Foreign Application Priority Data
Dec. 14, 2021 (CN) .......................... 202111524219.8

(51) Int. Cl.
*G06T 7/13* (2017.01)
*G06T 7/00* (2017.01)

(52) U.S. Cl.
CPC .............. *G06T 7/0002* (2013.01); *G06T 7/13* (2017.01); *G06T 2207/10016* (2013.01)

(58) Field of Classification Search
CPC ................................ G06T 7/0002; G06T 7/13
See application file for complete search history.

(56) References Cited

U.S. PATENT DOCUMENTS

| 2003/0202698 A1 | 10/2003 | Simard et al. |
| 2015/0116783 A1* | 4/2015 | Numata ............. H04N 1/00824 |
| | | 358/1.15 |

(Continued)

FOREIGN PATENT DOCUMENTS

| CN | 101599175 A | 12/2009 |
| CN | 111598906 A | 8/2020 |

(Continued)

OTHER PUBLICATIONS

International Search Report dated Sep. 2022, Application No. PCT/CN2022/095383.

(Continued)

*Primary Examiner* — Sam Bhattacharya
(74) *Attorney, Agent, or Firm* — DINSMORE & SHOHL LLP

(57) ABSTRACT

A video image interference detection method includes the following steps: acquiring a background image and a current frame image; constructing an edge image of the background image and an edge image of the current frame image respectively; intersecting the edge image of the background image and the edge image of the current frame image to obtain a same boundary image between the edge image of the background image and the edge image of the current frame image; counting a first pixel number in the edge image of the background image and a second pixel number in the same edge image; determining whether the current frame image is interfered according to a ratio of the first pixel number to the second pixel number.

17 Claims, 5 Drawing Sheets

(56) References Cited

U.S. PATENT DOCUMENTS

2022/0275677 A1* 9/2022 Lee ........................... G06T 7/74
2023/0196537 A1* 6/2023 Gupta ................... G06V 10/60
                                                                382/275

FOREIGN PATENT DOCUMENTS

CN   111898486 A   11/2020
CN   113936242 A   1/2022

OTHER PUBLICATIONS

Written Opinion dated Sep. 20, 2022, Application No. PCT/CN2022/095383.
First office action of corresponding Chinese application 2021115242198.
Wei, Jiang, Bus Passengers'Head Detecting Based on Edge-Based Background Subtraction and Hough Transform, 1994-2023 China Academic Journal Electronic Publishing House, 4 pages.

* cited by examiner

VIDEO IMAGE INTERFERENCE DETECTION METHOD, SYSTEM, DEVICE AND MEDIUM

CROSS-REFERENCE TO RELATED APPLICATIONS

This application is the U.S. National stage of PCT/CN2022/095383 filed on May 26, 2022, which claims the priority of Chinese patent application filed in CNIPA on Dec. 14, 2021, with an application number of 202111524219.8 and an application name of "A video image interference detection method, system, device and medium", the entire contents of which are incorporated into this application by reference.

TECHNICAL FIELD

This application relates to a video image interference detection method, a system, device and storage medium.

TECHNICAL BACKGROUND

In recent years, with an increasing requirement for improvement of video monitoring, there are more and more demands for intelligent video monitoring. People put forward a concept of intelligent video monitoring, and intelligent video monitoring technology has gradually developed. However, with the continuous development of intelligent video monitoring technology and the increasing application demand, the challenges faced by intelligent video monitoring system are also increasing, and many new practical problems have been put forward and studied one after another, the problem of interference detection is one of them.

In practical applications, there are a lot of various interferences in the monitoring system due to objective environments, human factors or other reasons. These interferences make the video collected by the monitoring system abnormal, and even make the whole monitoring system ineffective. Especially in a large-scale monitoring system, there are many cameras and an amount of video data collected is also very large. When there is serious interference in the video collected by one or more cameras, it is difficult to be detected by the staff in time.

In general, when there is interference in the monitoring system, the monitoring screen will change dramatically and it will last for a certain time, thus affecting the function of the monitoring system. Through a large number of studies, it is found that the interference mainly comes from three aspects: the first, a noise generated by a video signal itself in the process of acquisition and transmission in the monitoring system or an abnormal interference caused by the failure of the monitoring system; the second, an interference caused by changes in an objective environment of a scene monitored by the camera, such as weather, lighting and other conditions; the third, a deliberate destruction or interference by a lawless person in order to achieve some ulterior motives, resulting in the monitoring system not working normally and losing its monitoring function.

In the intelligent video monitoring system, except that the staff actively control the camera movement, generally speaking, the position and direction of the camera are fixed and unchanging, in other words, the monitoring scene of each camera is fixed and unchanging, and the video content collected by each camera is relatively similar, and the video content changes dramatically when there is interference. Based on this feature, the main interference detection methods comprise frame difference method and background subtraction method and etc.

Among them, the frame difference method is that when there is no interference in the monitoring video, contents of continuous multi-frame images change little, and differences between them are relatively small and relatively stable; the differences change more obviously when interference occurs. The frame difference method uses this principle to detect whether interference occurs. The principle of frame difference method has relatively low complexity, relatively fast operation speed, can quickly detect the interference, and has better real-time performance, but it is more sensitive to momentary accidental changes in monitoring video and is prone to false alarm phenomenon.

The background subtraction method is: the monitoring scene of each camera is fixed and unchanging, and the image content of each frame of monitoring video can be divided into two parts: a changing part and an unchanging part. Usually, the unchanging part is called background, while the changing part is called foreground or target. Generally speaking, the foreground part or target part accounts for a small proportion in monitoring images, so the background images in the monitoring video have a high degree of similarity to the images containing the foreground target. When the monitoring system is normal, the difference between the background image and the current frame image is small and the image contents are similar. When there is interference in the monitoring system, the background image is obviously different from the current frame image, and the image content changes dramatically. The background subtraction method uses a certain method to obtain the background image, and compares the difference between the current frame image and the background image by extracting appropriate image features to detect whether interference occurs. A key of the background subtraction method is the establishment of a background model and the update of the background. An appropriate background model can obtain high-quality background images in complex scenes with objective environment; the update process can make the background image adapt to various objective changes and interference of the monitoring scene, such as changes in external illumination and weather changes, etc., so as to make the detection effect more accurate. The inventor realized that the background model establishment and background update of background subtraction method are generally complicated, and have a large amount of calculation and relatively slow operation speed.

How to establish an appropriate background model, choose an appropriate background updating method, reduce the amount of calculation and improve the operation speed is the difficulty of background subtraction method.

SUMMARY

According to various embodiments disclosed in this application, a video image interference detection method is proposed, which comprises the following steps:
  acquiring a background image and a current frame image;
  constructing an edge image of the background image and an edge image of the current frame image respectively;
  intersecting the edge image of the background image and the edge image of the current frame image to obtain a same boundary image between the edge image of the background image and the edge image of the current frame image;

counting a first pixel number in the edge image of the background image and a second pixel number in the same edge image; and determining whether the current frame image is interfered according to a ratio of the first pixel number to the second pixel number.

In one or more embodiments, the step of determining whether the current frame image is interfered according to a ratio of the first pixel number to the second pixel number comprises:

in response to the ratio being greater than a first threshold, determining that the current frame image is not interfered; and in response to the ratio not being greater than the first threshold, determining that the current frame image is interfered.

In one or more embodiments, the step of in response to the ratio not being greater than the first threshold, determining that the current frame image is interfered, comprises:

in response to the ratio being not greater than the first threshold and being greater than a second threshold, determining that the interference to the current frame image is occlusion.

In one or more embodiments, the step of in response to the ratio not being greater than the first threshold, determining that the current frame image is interfered, comprises:

in response to the ratio being not greater than the second threshold and being greater than a third threshold, determining that the interference to the current frame image is out-of-focus.

In one or more embodiments, the step of in response to the ratio not being greater than the first threshold, determining that the current frame image is interfered, comprises:

in response to the ratio not being greater than the third threshold, determining that the interference to the current frame image is steering.

In one or more embodiments, further comprising:

setting different size of the first threshold, the second threshold and the third threshold according to different scenes.

In one or more embodiments, the step of constructing edge images of the background image and the current frame image respectively, comprises:

constructing the edge image of the background image and the edge image of the current frame by using a same operator and a same parameter through an edge detection algorithm.

Based on the same inventive concept, according to another aspect of this application, the embodiment of this application also provides a video image interference detection system, comprising:

an acquisition module, configured to acquire a background image and a current frame image;

a construction module, configured to construct edge images of the background image and the current frame image respectively;

an intersection module, configured to intersect the edge image of the background image and the edge image of the current frame image to obtain a same boundary image between the edge image of the background image and the edge image of the current frame image;

a counting module, configured to count a first pixel number in the edge image of the background image and a second pixel number in the same edge image; and a determining module, configured to determine whether the current frame image is interfered according to a ratio of the first pixel number to the second pixel number.

Based on the same inventive concept, according to another aspect of this application, the embodiment of this application also provides a computer device, which comprises a memory, configured to store computer-readable instructions; and one or more processors; wherein the computer-readable instructions, when executed by the one or more processors, cause the one or more processors to perform the steps of the method as described above.

Based on the same inventive concept, according to another aspect of this application, the embodiment of this application also provides one or more nonvolatile computer-readable storage media, configured to store computer-readable instructions, wherein the computer-readable instructions, when executed by one or more processors, cause the one or more processors to perform the steps of the method as described above.

Details of one or more embodiments of this application are set forth in the following drawings and description. Other features and advantages of this application will be apparent from the description, drawings and claims.

BRIEF DESCRIPTION OF DRAWINGS

In order to explain the embodiments of this application or the technical scheme in the prior art more clearly, the drawings needed to be used in the description of the embodiments or the prior art will be briefly introduced below. Obviously, the drawings in the following description are only one or more embodiments of this application, and other embodiments can be obtained according to these drawings without creative labor for ordinary people in the field.

DETAILED DESCRIPTION

In order to make the purpose, technical scheme and advantages of this application more clear, the embodiments of this application will be further described in detail with specific embodiments and with reference to the accompanying drawings.

It should be noted that all expressions of "first" and "second" in the embodiments of this application are used to distinguish two entities with the same name but not the same, or parameters that are not same, so it can be seen that "first" and "second" are only for the convenience of expression. It should not be understood as a limitation of the embodiments of this application, and the subsequent embodiments will not explain it one by one.

Figure 1:
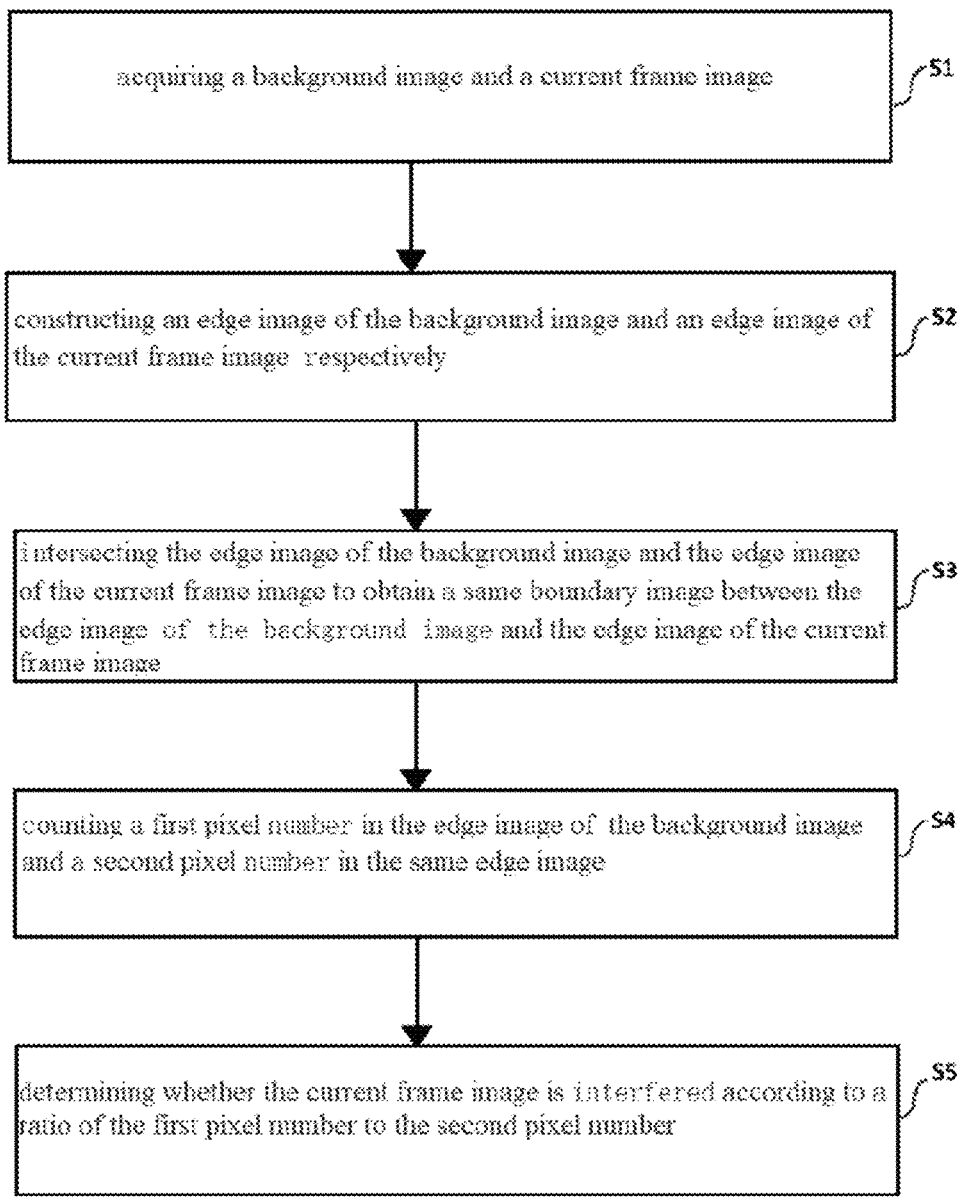
FIG. 1 is a flowchart of a video image interference detection method provided by an embodiment of this application.
Figure 2:
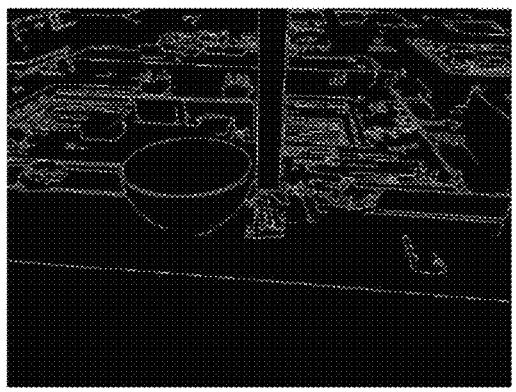
FIG. 2 is an edge image extracted from a background image.
Figure 3:
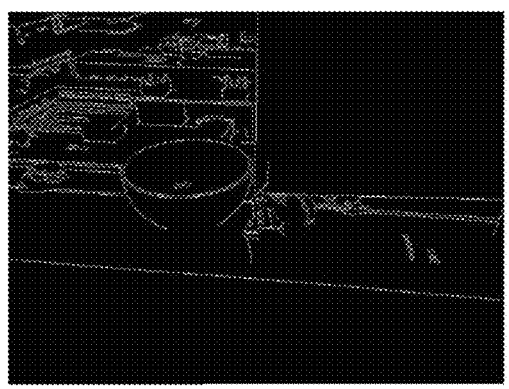
FIG. 3 is an edge image extracted from an image with occlusion interference.
Figure 4:
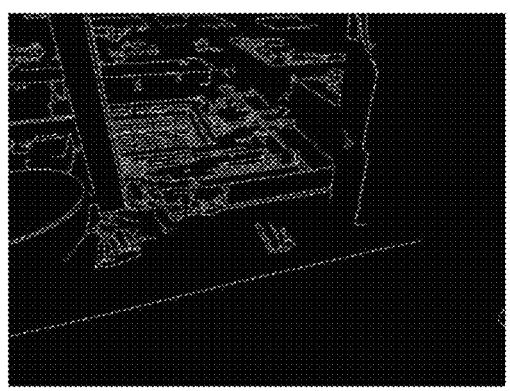
FIG. 4 is an edge image extracted from an image with steering interference.
Figure 5:
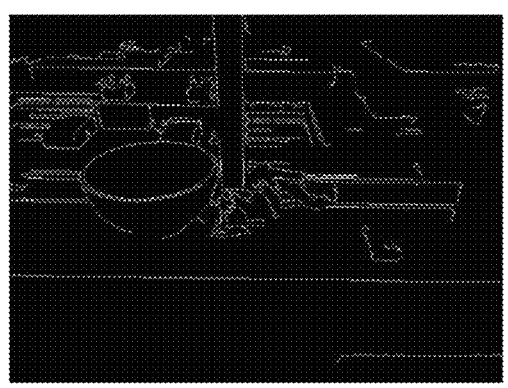
FIG. 5 is an edge image extracted from an image with out-of-focus interference.

According to one aspect of this application, an embodiment of this application proposes a video image interference detection method, as shown in FIG. 1, it can comprise the following steps:

S1, acquiring a background image and a current frame image;

S2, constructing an edge image of the background image and an edge image of the current frame image respectively;

S3, intersecting the edge image of the background image and the edge image of the current frame image to obtain a same boundary image between the edge image of the background image and the edge image of the current frame image;

S4, counting a first pixel number in the edge image of the background image and a second pixel number in the same edge image; and S5, determining whether the current frame image is interfered according to a ratio of the first pixel number to the second pixel number.

The scheme proposed in this application can detect the interference behavior in the video monitoring system, quickly identify the interference behavior in the video monitoring, and alarm the interference behavior in time.

In one or more embodiments, in step S1, acquiring a background image, the background can be calculated by adopting an average background model, every frame of the monitoring video will update the background, assuming that the background image is Background, when the image of the previous frame is Current-frame, a calculation formula for the updated background is:

Background=$a$*Current-frame+(1−$a$)*Background

In the above formula, ($a$ is an update coefficient, and the value of a is between 0 and 1.

In one or more embodiments, in step S2, constructing edge images of the background image and the current frame image respectively, comprises:

constructing the edge image of the background image and the edge image of the current frame by using a same operator and a same parameter through an edge detection algorithm.

The image edge refers to the boundary of an object in the image, and the edge is an important structural feature in the image. The edge often exists between the target and the background, as well as between different areas, so it can be used as an important basis for image segmentation. Pixels at the edge of an object in an image have sharp grayscale changes, such as the extracted edge images shown in FIG. 2 to FIG. 5. The grayscale profile of the edge area can be regarded as a step, that is, the grayscale of the image changes from a small area to another area with a significant difference. In conventional images, the edge information image has a pixel value of "1". Common edge algorithms are implemented by calculating the gradient of pixel values in the image, such as the common Roberts, Prewitt, Sobel. Lapacian operators.

When the edge detection algorithm is used to extract the edge image (Frame-Edge) of the current frame (current-frame) image and acquire the edge image (BG-Edge) of the background image ( ), it is necessary to use the same operator with consistent parameters to ensure that there will be no strong boundary or self-boundary, which will affect the subsequent comparison of the same boundary.

In one or more embodiments, in step S3, intersecting the edge image of the background image and the edge image of the current frame image to obtain a same boundary image between the edge image of the background image and the edge image of the current frame image. The edge image of the current frame image is Current-Edge and the edge image of the background image is BG-Edge, then the same boundary (Static-Edge) can be calculated by Current-Edge and BG-Edge, that is, the same boundary can be determined by judging whether there are pixels in the positions corresponding to the same coordinates in the two edge images, and the same boundary image can be obtained after traversing the whole coordinates.

In one or more embodiments, in step S4, counting a first pixel number in the edge image of the background image and a second pixel number in the same edge image. After the same edge image is obtained, each coordinate in the same edge image can be traversed, so that the number of pixels in the same edge image can be counted, and the pixel number in the edge image of the background image can be obtained by the same method.

In one or more embodiments, S5, determining whether the current frame image is interfered according to a ratio of the first pixel number to the second pixel number, comprising:

in response to the ratio being greater than a first threshold, determining that the current frame image is not interfered, and in response to the ratio not being greater than the first threshold, determining that the current frame image is interfered.

After calculating the ratio P between the number of pixels in the same edge image and the number of pixels in the edge image of the background image, that is, the interference behavior can be judged and identified according to the value range of the ratio P.

According to the ratio calculation formula, the larger the ratio, the more similar the current frame image is to the background image, and the lower the probability of interference occurring.

In one or more embodiments, the interference can comprise steering, occlusion, and out-of-focus.

Wherein, the occlusion refers to that the camera lens surface is covered by foreign objects due to objective environment or human factors, such as long-term dust accumulation, spray painting, deliberate occlusion, etc., which leads to a sharp decrease or complete disappearance of scene information in the monitoring video. For example, for the background image shown in FIG. 6, the image shown in FIG. 7 is the occluded image. Therefore, occlusion refers to partial occlusion, usually the occlusion area is not more than 30% of the screen. For the behavior of occlusion of the camera, the screen can be divided into normal area and occlusion area. There is no difference between the normal area and the background, and there is almost no intersection between the edge of the occlusion area and the background. Overall, the P value at this time is roughly 50.

Figure 8:
FIG. 8 is a schematic diagram of the image after steering interference occurs in the background image shown in FIG. 6.

The steering refers to that due to deliberate destruction or other reasons, the camera rotates at a certain angle and deviates from the normal monitoring position, resulting in errors in the monitoring scene and missing the scene information of the monitoring site. For example, for the background image shown in FIG. 6, the image shown in FIG. 8 is the image after rotating. Therefore, after the camera is rotated, although most of the images may be the same, the objects in the images are displaced uniformly, so the number of common edges of the two edge images is limited. At this time, the value of P is close to 0.

Figure 6:
FIG. 6 is a schematic diagram of a background image.
Figure 7:
FIG. 7 is a schematic diagram of the image after occlusion interference occurs in the background image shown in FIG. 6.
Figure 9:
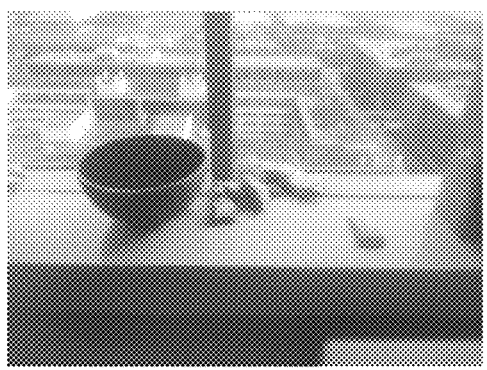
FIG. 9 is a schematic diagram of the image after out-of-focus occurs in the background image shown in FIG. 6.

The out-of-focus refers to the change in the focal length of the camera due to various reasons, resulting in inaccurate focusing, resulting in a degradation in the quality of the monitoring video and blurring, for example, for the background image shown in FIG. 6, the image shown in FIG. 9 is the out-of-focus image. Therefore, for the out-of-focus camera, the content of the imaging screen is blurred. The out-of-focus image has the same image content as the background image, but the image details in the out-of-focus image are much less than those in the background image. The edge image reflects the details in the image, so the number of edges in the out-of-focus image is less than that in the background image, and the residual edges are basically the same as those of the background image. So the value of P is between steering and occlusion.

In one or more embodiments, the step of in response to the ratio not being greater than the first threshold, determining that the current frame image is interfered, comprises:
  in response to the ratio being not greater than the first threshold and being greater than a second threshold, determining that the interference to the current frame image is occlusion.

In one or more embodiments, the step of in response to the ratio not being greater than the first threshold, determining that the current frame image is interfered, comprises:
  in response to the ratio being not greater than the second threshold and being greater than a third threshold, determining that the interference to the current frame image is out-of-focus.

In one or more embodiments, the step of in response to the ratio not being greater than the first threshold, determining that the current frame image is interfered, comprises:
  in response to the ratio not being greater than the third threshold, determining that the interference to the current frame image is steering.

Because three kinds of interference behaviors, namely steering, occlusion and out-of-focus, will cause the edge of the monitoring image to change, and a ratio of the same boundary of the three behaviors is also different, the interference behaviors can be judged and discriminated by comparing the number of pixels in the same boundary between the current frame image and the background image. The ratio of the same boundary between the three kinds of interference behavior images and the background image satisfies the following relationship: P steering<P out-of-focus<P occlusion<P normal.

Therefore, in order to quantify the boundary between the three, the threshold values between the three are set as Th1, Th2 and Th3 respectively, that is, the following relationship is satisfied: P steering≤Th3<P out-of-focus≤Th2<P occlusion≤77<P normal.

In this way, when the value of P is greater than Th1, it can be judged that there is no interference behavior in the current frame image, and there is no need to alarm at this time. If the value of P is less than T1, it means that there is an interference, and it is necessary to judge the interference behavior according to P. If the value of P is between Th2 and Th1, then it can be judged that this interference behavior is an occlusion behavior. If the value of P is between Th3 and Th2, then it can be judged that this interference behavior is an out-of-focus behavior. If the value of P is between 0 and Th3, it can be judged that this interference behavior is a steering behavior.

In one or more embodiments, it further comprises:
  setting different size of the first threshold, the second threshold and the third threshold according to different scenes.

Different sizes of the first threshold, the second threshold and the third threshold can be set for different scenes, for example, for a certain scene, statistics are performed on the values of the same edge ratio P in hundreds of typical interfering videos in a training set of interfering videos, to determine a group of more effective thresholds: Th1=45, Th2=25 and Th3=13.

The scheme proposed in this application can be used to detect the interference behavior in a video monitoring system by using an edge contrast algorithm, and can quickly identify the interference behavior in the video monitoring, so as to alarm the interference behavior in time.

It should be understood that although the steps in the flowchart of FIG. 1 are shown in sequence as indicated by arrows, these steps are not necessarily executed in sequence as indicated by arrows. Unless explicitly stated in this description, the execution of these steps is not strictly limited in order, and these steps can be executed in other orders. Moreover, at least one partial steps in FIG. 1 may comprise multiple sub-steps or multiple stages, which may not necessarily be completed at the same time, and may be executed at different times, and the execution orders of these sub-steps or stages may not necessarily be sequentially executed, and may be alternately or alternatively executed with other steps or sub-steps of other steps or at least a part of stages.

Figure 10:
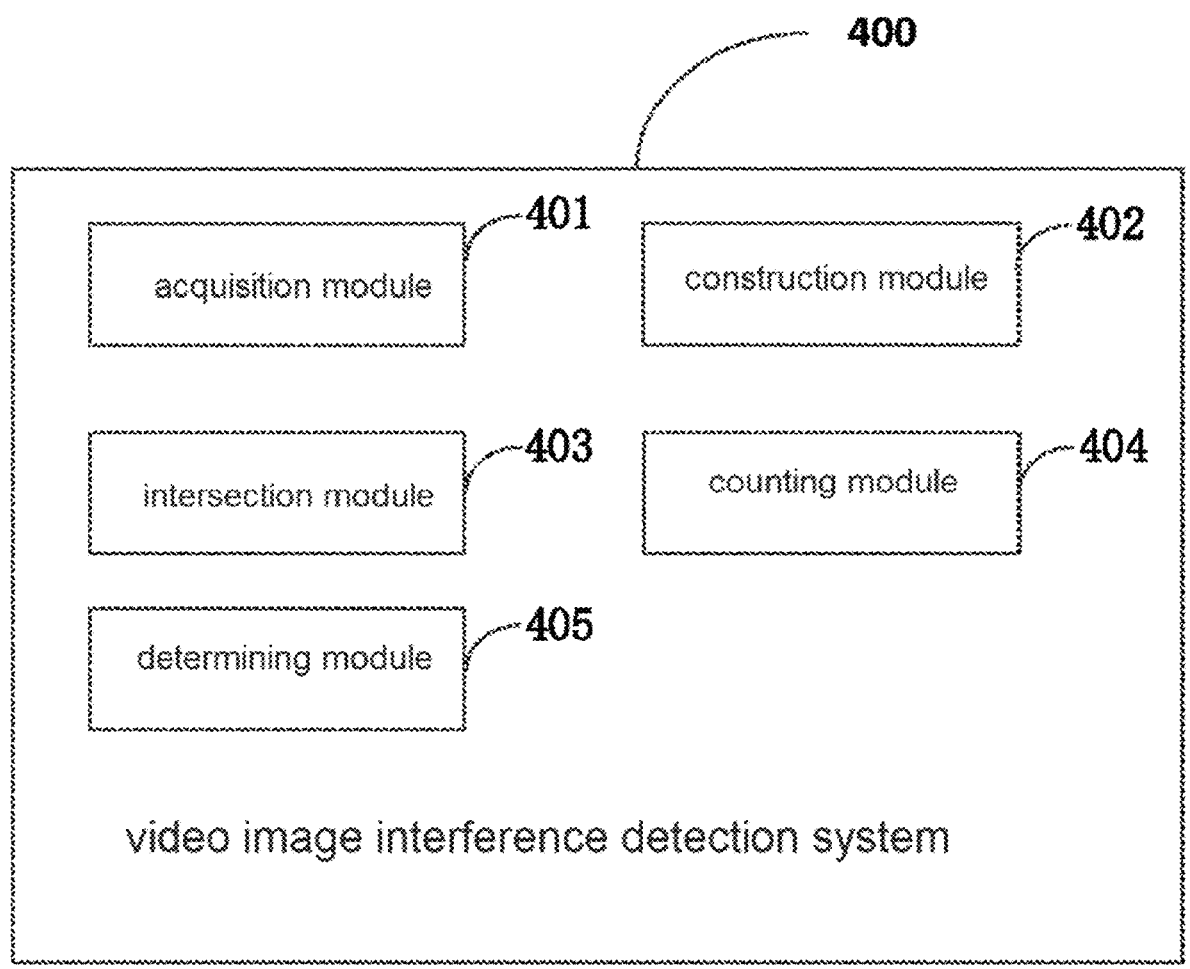
FIG. 10 is a schematic structural diagram of a video image interference detection system provided by an embodiment of this application.

Based on the same inventive concept, according to another aspect of this application, the embodiment of this application also provides a video image interference detection system 400, as shown in FIG. 10, comprising:
  an acquisition module 401, configured to acquire a background image and a current frame image;
  a construction module 402, configured to construct edge images of the background image and the current frame image respectively;
  an intersection module 403, configured to intersect the edge image of the background image and the edge image of the current frame image to obtain a same boundary image between the edge image of the background image and the edge image of the current frame image;
  a counting module 404, configured to count a first pixel number in the edge image of the background image and a second pixel number in the same edge image; and
  a determining module 405, configured to determine whether the current frame image is interfered according to a ratio of the first pixel number to the second pixel number.

In one or more embodiments, the determining module 405 further configured to:
  in response to the ratio being greater than a first threshold, determining that the current frame image is not interfered; and
  in response to the ratio not being greater than the first threshold, determining that the current frame image is interfered.

In one or more embodiments, the determining module 405 further is configured to:
in response to the ratio being not greater than the first threshold and being greater than a second threshold, determine that the interference to the current frame image is occlusion.

In one or more embodiments, the determining module 405 further is configured to:
in response to the ratio being not greater than the second threshold and being greater than a third threshold, determine that the interference to the current frame image is out-of-focus.

In one or more embodiments, the determining module 405 further is configured to:
in response to the ratio not being greater than the third threshold, determine that the interference to the current frame image is steering.

In one or more embodiments, further comprising a threshold setting module, the threshold setting module is configured to:
set different size of the first threshold, the second threshold and the third threshold according to different scenes.

In one or more embodiments, the construction module 402 further is configured to:
construct the edge image of the background image and the edge image of the current frame by using a same operator and a same parameter through an edge detection algorithm.

The scheme proposed in this application can be used to detect the interference behavior in the video monitoring system by using an edge contrast algorithm, and can quickly identify the interference behavior in the video monitoring, so as to alarm the interference behavior in time.

Figure 11:
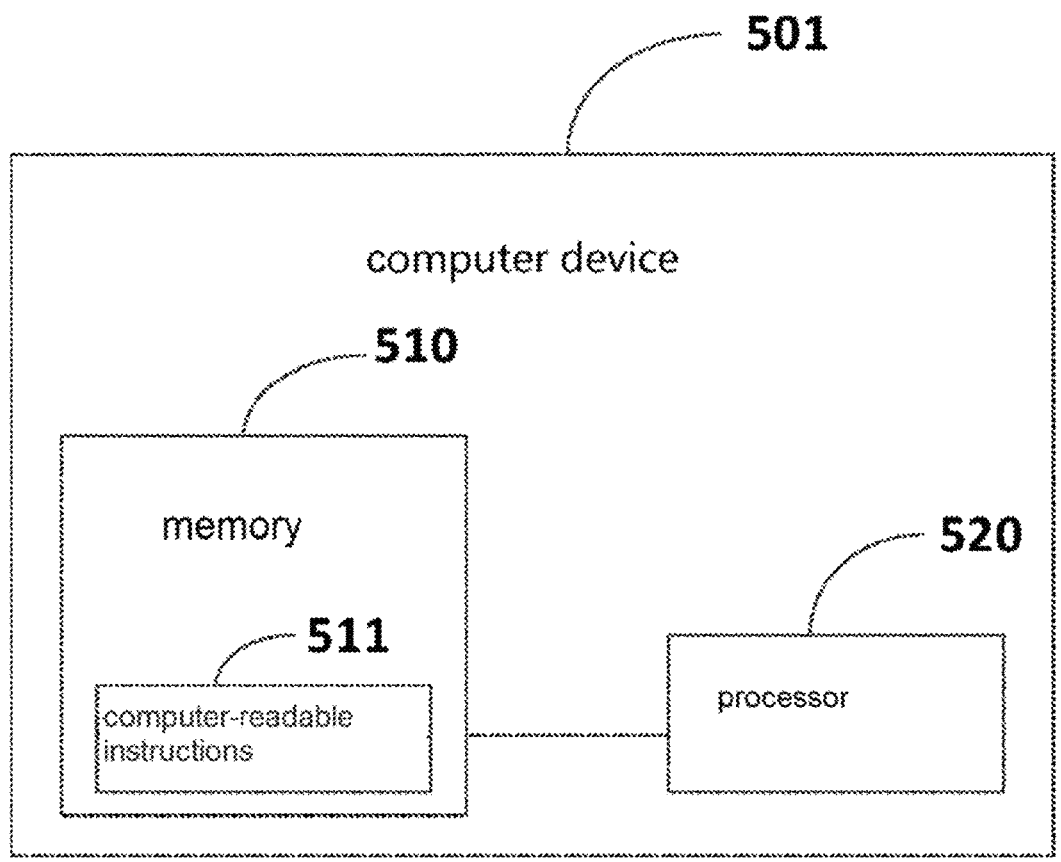
FIG. 11 is a schematic structural diagram of a computer device provided by an embodiment of this application.

Based on the same inventive concept, according to another aspect of this application, as shown in FIG. 11, the embodiment of this application also provides a computer device 501, which comprises one or more processors 520 and a memory 510, and the memory 510 stores computer-readable instructions 511 that can be run on the processors. When the computer-readable instructions 511 are executed by the one or more processors, the one or more processors 520 can implement steps of the video image interference detection method according to any of the above embodiments.

The scheme proposed in this application can be used to detect the interference behavior in the video monitoring system by using an edge contrast algorithm, and can quickly identify the interference behavior in the video monitoring, so as to alarm the interference behavior in time.

Figure 12:
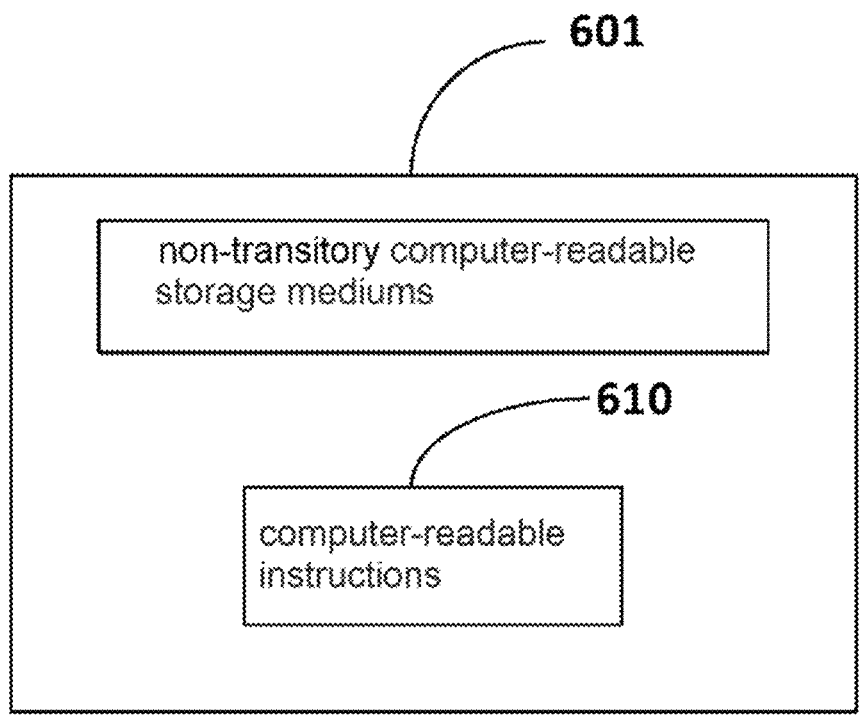
FIG. 12 is a schematic structural diagram of a computer readable storage medium provided by an embodiment of this application.

Based on the same inventive concept, according to another aspect of this application, as shown in FIG. 12, the embodiment of this application also provides one or more nonvolatile computer-readable storage mediums 601, and the computer-readable storage mediums 601 store computer-readable instructions 610, which, when executed by a processor, implement steps of the video image interference detection method according to any of the above embodiments.

The scheme proposed in this application can be used to detect the interference behavior in the video monitoring system by using an edge contrast algorithm, and can quickly identify the interference behavior in the video monitoring, so as to alarm the interference behavior in time.

Finally, it should be noted that those skilled in the art can understand that all or part of the processes in the methods of the above-mentioned embodiments can be completed by instructing related hardware through computer-readable instructions, which can be stored in one or more nonvolatile computer-readable storage mediums, and when executed by one or more processors, the computer-readable instructions can implement the steps comprising the embodiments of the above-mentioned methods. Wherein, any reference to memory, storage, database or other medium used in the embodiments provided in this application may comprise non-volatile and/or volatile memory. The nonvolatile memory may comprise read-only memory (ROM), programmable ROM (PROM), electrically programmable ROM (EPROM), electrically erasable programmable ROM (EEPROM) or flash memory. Volatile memory may comprise random access memory (RAM) or external cache memory. By way of illustration and not limitation. RAM is available in various forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink), DRAM (SLDRAM), memory bus (Rambus) direct RAM (RDRAM), direct memory bus dynamic RAM (DRDRAM), and memory bus dynamic RAM (RDRAM), etc.

Those skilled in the art will further appreciate that the various illustrative logical blocks, modules, circuits, and algorithm steps described in connection with the disclosure herein may be implemented as electronic hardware, computer software, or combinations of both. In order to clearly illustrate this interchangeability of hardware and software, the functions of various illustrative components, blocks, modules, circuits and steps have been generally described. Whether these functions are implemented as software or hardware depend on the specific application and the design constraints imposed on the whole system. Those skilled in the art can implement the functions in various ways for each specific application, but this implement decision should not be interpreted as causing a departure from the scope disclosed in the embodiments of this application.

The above are exemplary embodiments disclosed in this application, but it should be noted that various changes and modifications can be made without departing from the scope disclosed in the embodiments of this application as defined by the claims. The functions, steps and/or actions of the method claims according to the disclosed embodiments described herein need not be performed in any particular order. In addition, although the elements disclosed in the practical examples of this application can be described or required in an individual form, they can also be understood as plural unless explicitly limited to the singular.

It should be understood that as used herein, the singular form "a" and "an" are intended to comprise the plural form, unless the context clearly supports exceptions. It should also be understood that "and/or" as used herein refers to any and all possible combinations comprising one or more items listed in association.

The above serial numbers of the embodiments disclosed in the embodiments of this application are only for description, and do not represent the advantages and disadvantages of the embodiments.

Those skilled in the art can understand that all or part of the steps to implement the above-mentioned embodiments can be completed by hardware, or by instructing related hardware through programs, the programs can be stored in computer-readable storage mediums, and the above-mentioned storage mediums can be read-only memory, magnetic disk or optical disk.

It should be understood by those skilled in the art that the discussion of any of the above embodiments is only exemplary, and it is not intended to imply that the scope (comprising claims) disclosed by the embodiments of this application is limited to these examples; under the idea of the embodiment of this application, the technical features in the above embodiments or different embodiments can also be combined, and there are many other variations in different aspects of the embodiments of this application, which are not provided in the details for the sake of conciseness. Therefore, any omission, modification, equivalent substitution, improvement, etc. made within the spirit and principle of the embodiments of this application should be comprised in the protection scope of the embodiments of this application.

What is claimed is:

1. A video image interference detection method, comprising:
   acquiring a background image and a current frame image;
   constructing an edge image of the background image and an edge image of the current frame image respectively;
   intersecting the edge image of the background image and the edge image of the current frame image to obtain a same boundary image between the edge image of the background image and the edge image of the current frame image;
   counting a first pixel number in the edge image of the background image and a second pixel number in the same edge image; and
   determining whether the current frame image is interfered according to a ratio of the first pixel number to the second pixel number,
   wherein the step of determining whether the current frame image is interfered according to a ratio of the first pixel number to the second pixel number comprises:
   in response to the ratio being greater than a first threshold, determining that the current frame image is not interfered; and
   in response to the ratio not being greater than the first threshold, determining that the current frame image is interfered.

2. The method according to claim 1, wherein the step of in response to the ratio not being greater than the first threshold, determining that the current frame image is interfered, comprises:
   in response to the ratio being not greater than the first threshold and being greater than a second threshold, determining that the interference to the current frame image is occlusion.

3. The method according to claim 2, wherein the step of in response to the ratio not being greater than the first threshold, determining that the current frame image is interfered, comprises:
   in response to the ratio being not greater than the second threshold and being greater than a third threshold, determining that the interference to the current frame image is out-of-focus.

4. The method according to claim 3, wherein the step of in response to the ratio not being greater than the first threshold, determining that the current frame image is interfered, comprises:
   in response to the ratio not being greater than the third threshold, determining that the interference to the current frame image is steering.

5. The method according to claim 4, further comprising:
   setting different size of the first threshold, the second threshold and the third threshold according to different scenes.

6. The method according to claim 1, wherein the step of constructing edge images of the background image and the current frame image respectively, comprises:
   constructing the edge image of the background image and the edge image of the current frame by using a same operator and a same parameter through an edge detection algorithm.

7. The method according to claim 1, wherein the step of intersecting the edge image of the background image and the edge image of the current frame image to obtain a same boundary image between the edge image of the background image and the edge image of the current frame image, comprises:
   determining the same boundary by judging whether there are pixels in the positions corresponding to the same coordinates in the two edge images, and obtaining the same boundary image after traversing the whole coordinates.

8. The method according to claim 1, wherein the step of counting a first pixel number in the edge image of the background image and a second pixel number in the same edge image, comprises:
   traversing each coordinate in the same edge image to count the second pixel number in the same edge image;
   traversing each coordinate in the background image to count the first pixel number in the edge image of the background image.

9. The method according to claim 1, it further comprises:
   alarming the interference to the current frame image.

10. One or more nonvolatile computer-readable storage mediums, configured to store computer-readable instructions, wherein the computer-readable instructions, when executed by one or more processors, cause the one or more processors to perform the steps of the video image interference detection method, wherein the steps comprising:
    acquiring a background image and a current frame image;
    constructing an edge image of the background image and an edge image of the current frame image respectively;
    intersecting the edge image of the background image and the edge image of the current frame image to obtain a same boundary image between the edge image of the background image and the edge image of the current frame image;
    counting a first pixel number in the edge image of the background image and a second pixel number in the same edge image; and
    determining whether the current frame image is interfered according to a ratio of the first pixel number to the second pixel number,
    wherein the step of determining whether the current frame image is interfered according to a ratio of the first pixel number to the second pixel number comprises:
    in response to the ratio being greater than a first threshold, determining that the current frame image is not interfered; and
    in response to the ratio not being greater than the first threshold, determining that the current frame image is interfered.

11. The nonvolatile computer-readable storage mediums according to claim 10, wherein the step of constructing edge images of the background image and the current frame image respectively, comprises:
    constructing the edge image of the background image and the edge image of the current frame by using a same operator and a same parameter through an edge detection algorithm.

12. A computer device, comprising:
a memory, configured to store computer-readable instructions; and
one or more processors;
wherein the computer-readable instructions, when executed by the one or more processors, cause the one or more processors to perform the steps of a video image interference detection method, wherein the steps comprising:
acquiring a background image and a current frame image;
constructing an edge image of the background image and an edge image of the current frame image respectively;
intersecting the edge image of the background image and the edge image of the current frame image to obtain a same boundary image between the edge image of the background image and the edge image of the current frame image;
counting a first pixel number in the edge image of the background image and a second pixel number in the same edge image; and
determining whether the current frame image is interfered according to a ratio of the first pixel number to the second pixel number,
wherein the step of determining whether the current frame image is interfered according to a ratio of the first pixel number to the second pixel number comprises:
in response to the ratio being greater than a first threshold, determining that the current frame image is not interfered; and
in response to the ratio not being greater than the first threshold, determining that the current frame image is interfered.

13. The computer device according to claim 12, wherein the step of in response to the ratio not being greater than the first threshold, determining that the current frame image is interfered, comprises:
in response to the ratio being not greater than the first threshold and being greater than a second threshold, determining that the interference to the current frame image is occlusion.

14. The computer device according to claim 13, wherein the step of in response to the ratio not being greater than the first threshold, determining that the current frame image is interfered, comprises:
in response to the ratio being not greater than the second threshold and being greater than a third threshold, determining that the interference to the current frame image is out-of-focus.

15. The computer device according to claim 14, wherein the step of in response to the ratio not being greater than the first threshold, determining that the current frame image is interfered, comprises:
in response to the ratio not being greater than the third threshold, determining that the interference to the current frame image is steering.

16. The computer device according to claim 15, further comprising:
setting different size of the first threshold, the second threshold and the third threshold according to different scenes.

17. The computer device according to claim 12, wherein the step of constructing edge images of the background image and the current frame image respectively, comprises:
constructing the edge image of the background image and the edge image of the current frame by using a same operator and a same parameter through an edge detection algorithm.

* * * * *